(12) United States Patent
Zheng et al.

(10) Patent No.: US 11,441,763 B2
(45) Date of Patent: Sep. 13, 2022

(54) LIGHTING APPARATUS

(71) Applicant: XIAMEN LEEDARSON LIGHTING CO., LTD, Fujian (CN)

(72) Inventors: Zongjiang Zheng, Fujian (CN); Fucheng Sun, Fujian (CN); Wenhui Yang, Fujian (CN); Shouqiang Hou, Fujian (CN); Yongzhe Dong, Fujian (CN); Xiaoliang Wen, Fujian (CN)

(73) Assignee: XIAMEN LEEDARSON LIGHTING CO., LTD, Fujian (CN)

( * ) Notice: Subject to any disclaimer, the term of this patent is extended or adjusted under 35 U.S.C. 154(b) by 0 days.

(21) Appl. No.: 17/027,315

(22) Filed: Sep. 21, 2020

(65) Prior Publication Data
US 2021/0088205 A1    Mar. 25, 2021

(30) Foreign Application Priority Data
Sep. 20, 2019   (CN) .......................... 201921576339.0

(51) Int. Cl.
| | |
|---|---|
| *F21V 23/04* | (2006.01) |
| *F21V 7/04* | (2006.01) |
| *F21V 23/00* | (2015.01) |
| *F21V 25/00* | (2006.01) |
| *F21S 8/02* | (2006.01) |
| *F21Y 115/10* | (2016.01) |
| *F21V 17/14* | (2006.01) |

(52) U.S. Cl.
CPC ............... *F21V 23/04* (2013.01); *F21S 8/02* (2013.01); *F21V 7/043* (2013.01); *F21V 23/003* (2013.01); *F21V 25/00* (2013.01); *F21V 17/14* (2013.01); *F21V 23/008* (2013.01); *F21Y 2115/10* (2016.08)

(58) Field of Classification Search
CPC . F21V 23/04; F21V 23/008; F21S 8/02; F21S 2/005
See application file for complete search history.

(56) References Cited

U.S. PATENT DOCUMENTS

| | | | | |
|---|---|---|---|---|
| 1,895,050 | A * | 1/1933 | Russell ..................... | F21S 8/04 200/51.02 |
| 7,461,964 | B1 * | 12/2008 | Aubrey ............... | F21V 19/0065 362/647 |
| 7,478,931 | B2 * | 1/2009 | Miletich ................... | F21S 8/02 362/147 |
| 10,697,615 | B1 * | 6/2020 | Rashidi Doust ...... | F21V 23/005 |
| 10,760,774 | B1 * | 9/2020 | Zheng .................. | F21V 23/008 |
| 2006/0133096 | A1 * | 6/2006 | Corbett .................. | F21S 8/028 362/372 |

(Continued)

*Primary Examiner* — William N Harris
(74) *Attorney, Agent, or Firm* — Chun-Ming Shih; Lanway IPR Services

(57) ABSTRACT

A lighting apparatus includes a limit switch, a wiring box, a base holder and a light source module. The wiring box is for disposing the limit switch and for receiving a power wire connected to an external power. The base holder having a terminal connector electrically connected to the wiring box. The base holder has an opening for inserting a lever of the limit switch. The light source module is installed into the base holder. The light source module triggers the lever of the limit switch to turn on power supply to the light source module via the power wire and the terminal connector.

19 Claims, 14 Drawing Sheets

(56) References Cited

U.S. PATENT DOCUMENTS

| | | | |
|---|---|---|---|
| 2014/0104844 A1* | 4/2014 | Fereydouny | F21V 17/14 |
| | | | 362/293 |
| 2014/0307450 A1* | 10/2014 | Cho | F21S 8/02 |
| | | | 362/364 |
| 2017/0191641 A1* | 7/2017 | Harpenau | F21V 17/12 |
| 2018/0058676 A1* | 3/2018 | Huang | F21V 23/005 |
| 2020/0149725 A1* | 5/2020 | Walma, Jr. | F21S 8/026 |
| 2020/0299114 A1* | 9/2020 | Shin | B66D 1/12 |

* cited by examiner

LIGHTING APPARATUS

FIELD

The present invention is related to a lighting apparatus, and more particularly related to a lighting apparatus easy to be installed and detached.

BACKGROUND

The time when the darkness is being lighten up by the light, human have noticed the need of lighting up this planet. Light has become one of the necessities we live with through the day and the night. During the darkness after sunset, there is no natural light, and human have been finding ways to light up the darkness with artificial light. From a torch, candles to the light we have nowadays, the use of light have been changed through decades and the development of lighting continues on.

Early human found the control of fire which is a turning point of the human history. Fire provides light to bright up the darkness that have allowed human activities to continue into the darker and colder hour of the hour after sunset. Fire gives human beings the first form of light and heat to cook food, make tools, have heat to live through cold winter and lighting to see in the dark.

Lighting is now not to be limited just for providing the light we need, but it is also for setting up the mood and atmosphere being created for an area. Proper lighting for an area needs a good combination of daylight conditions and artificial lights. There are many ways to improve lighting in a better cost and energy saving. LED lighting, a solid-state lamp that uses light-emitting diodes as the source of light, is a solution when it comes to energy-efficient lighting. LED lighting provides lower cost, energy saving and longer life span.

The major use of the light emitting diodes is for illumination. The light emitting diodes is recently used in light bulb, light strip or light tube for a longer lifetime and a lower energy consumption of the light. The light emitting diodes shows a new type of illumination which brings more convenience to our lives. Nowadays, light emitting diode light may be often seen in the market with various forms and affordable prices.

After the invention of LEDs, the neon indicator and incandescent lamps are gradually replaced. However, the cost of initial commercial LEDs was extremely high, making them rare to be applied for practical use. Also, LEDs only illuminated red light at early stage. The brightness of the light only could be used as indicator for it was too dark to illuminate an area. Unlike modern LEDs which are bound in transparent plastic cases, LEDs in early stage were packed in metal cases.

In 1878, Thomas Edison tried to make a usable light bulb after experimenting different materials. In November 1879, Edison filed a patent for an electric lamp with a carbon filament and keep testing to find the perfect filament for his light bulb. The highest melting point of any chemical element, tungsten, was known by Edison to be an excellent material for light bulb filaments, but the machinery needed to produce super-fine tungsten wire was not available in the late 19th century. Tungsten is still the primary material used in incandescent bulb filaments today.

Early candles were made in China in about 200 BC from whale fat and rice paper wick. They were made from other materials through time, like tallow, spermaceti, colza oil and beeswax until the discovery of paraffin wax which made production of candles cheap and affordable to everyone. Wick was also improved over time that made from paper, cotton, hemp and flax with different times and ways of burning. Although not a major light source now, candles are still here as decorative items and a light source in emergency situations. They are used for celebrations such as birthdays, religious rituals, for making atmosphere and as a decor.

Illumination has been improved throughout the times. Even now, the lighting device we used today are still being improved. From the illumination of the sun to the time when human can control fire for providing illumination which changed human history, we have been improving the lighting source for a better efficiency and sense. From the invention of candle, gas lamp, electric carbon arc lamp, kerosene lamp, light bulb, fluorescent lamp to LED lamp, the improvement of illumination shows the necessity of light in human lives.

There are various types of lighting apparatuses. When cost and light efficiency of LED have shown great effect compared with traditional lighting devices, people look for even better light output. It is important to recognize factors that can bring more satisfaction and light quality and flexibility.

It is important to design a lighting device that can be easily installed and detached.

This is particularly helpful in commercial environments. In addition, wiring is an important factor to consider when design such light device.

It is beneficial to design a lighting apparatus with safe assembly capability and flexibility to be replaced with different modules. It is important to design a lighting device that can be easily installed and detached.

This is particularly helpful in commercial environments. In addition, wiring is an important factor to consider when design such light device.

It is beneficial to design a lighting apparatus with safe assembly capability and flexibility to be replaced with different modules. It is important to design a lighting device that can be easily installed and detached.

This is particularly helpful in commercial environments. In addition, wiring is an important factor to consider when design such light device.

It is beneficial to design a lighting apparatus with safe assembly capability and flexibility to be replaced with different modules. It is important to design a lighting device that can be easily installed and detached.

This is particularly helpful in commercial environments. In addition, wiring is an important factor to consider when design such light device.

It is beneficial to design a lighting apparatus with safe assembly capability and flexibility to be replaced with different modules.

SUMMARY

In some embodiments, a lighting apparatus includes a limit switch, a wiring box, a base holder, and a light source module.

The wiring box is for disposing the limit switch and for receiving a power wire connected to an external power.

The base holder has a terminal connector electrically connected to the wiring box.

The base holder has an opening for inserting a lever of the limit switch.

The light source module is installed into the base holder.

The light source module triggers the lever of the limit switch to turn on power supply to the light source module via the power wire and the terminal connector.

Specifically, a lighting apparatus has a wiring box. The wiring box is fixed to the base holder and may be installed to an installation platform, like a cavity of a ceiling or a junction box.

The wiring box is used for guiding a power wire to enter a terminal connector of the base holder. There are some springs, e.g. an elastic pipe or elastic spring, for simplifying the assembly of the lighting apparatus.

The light source module may include a housing, a light source plate, lens, a light passing cover, and/or a reflector cup. There are various types that may be installed and attached to the base holder, e.g. a downlight device, a spot light, a light tube, a light bulb, a panel light.

In some embodiments, the light source module may also include a driver that may have corresponding driver circuits for generating a driving current by converting an external power source supplied from the power wire. In addition, the driver circuits may receive a wireless command or a control signal to adjust output of the LED module on the light source plate.

The light source module is connected to the terminal connector. The terminal connector may provide an electrical connection to the power wire. In addition, the terminal connector may have a structure connector for holding and fixing the light source module.

The lever of the limit switch enters the inner part of the base holder so as to be able to engage the light source module. When the light source module is installed successfully into the base holder, the housing of the light source module engages and presses the lever of the limit switch to enable the electrical path from the power wire.

When the light source module is not installed to the correct position, the lever of the limit switch is not pressed or moved and thus the electrical path from the power path is kept open, i.e. no electricity entering the electrical path to keep the base holder safe, not to cause accident of electrical shock.

In some embodiments, the light source module is attached to the base holder by inserting the light source module to approach an inner top of the base holder.

When a relative distance between a first top of the light source module and the inner top of the base holder is less than a predetermined threshold, the first top of the light source module moves the lever of the limit switch to turn on the power supply.

The base holder has an entrance and may have a tubular, a cup or a cylinder shape. The light source module is inserted to connect to the base holder via the entrance.

The light source module is inserted to approach, get closer to the inner top of the base holder.

The lever of the limit switch is positioned at a moving path for the light source module to insert the base holder. Finally, the first top of the light source module engages and presses the lever of the limit switch to turn on the power supply, making electricity to be successfully conducted to the light source module if other factors are met, e.g. the light source module is turned on.

In some embodiments, a ratio between the predetermined threshold to a height of the base holder is between 0.1 to 0.3.

The base holder may have a depth length, i.e. the height of the base holder, along the path for the light source module to enter and connect to the base holder.

The predetermined threshold refers to the distance of the lever of the limit switch to the inner top of the base holder. To keep the lever performing its goal to keep people safe, the ratio between the predetermined threshold to a height of the base holder is between 0.1 to 0.3. In other words, the predetermined threshold is about 10% to 30% of the total height of the base holder.

In some embodiments, the top of the light source module has multiple fixing columns, each fixing column has a protruding head and a narrow neck.

A diameter of the protruding head is larger than the narrow neck.

The base holder has multiple sliding grooves for inserting and fixing columns.

When the fixing column are inserted into the sliding grooves and rotate with respect to the sliding groove, the light source module is fixed to the base holder.

For example, the top of the light source module has a pair of fixing columns. Each fixing column has a head portion (the protruding head) larger than a neck portion (the narrow neck).

The fixing columns of the light source module are corresponding to the sliding grooves of the base holder respectively. The sliding groove has an entrance part with larger diameter for the protruding head to pass through. The sliding groove has a narrower sliding path so that the protruding head is kept inside the sliding groove while the narrow neck is moved along the sliding path of the sliding groove.

Such design makes the light source module to be fixed to the base holder.

In some embodiments, a first diameter of an entrance part of the sliding groove is larger than the diameter of the protruding head.

A sliding part of the sliding groove has a second diameter larger than the narrow neck and small than the protruding head.

In some embodiments, the terminal connector is located at a center position symmetrically surrounding by the sliding grooves.

In some embodiments, the terminal connector is used for routing electricity from the power wire partly stored in the wiring box.

The terminal connector may have a plugging socket for connecting to a connecting wire at one end while the other end of the connecting wire is connected to the light source module.

In some other embodiments, the terminator may have an extended wire that may be directly plugged or fixed to the light source module in various ways, e.g. glue tapes.

In some embodiments, the light source module is a downlight device with multiple fixing springs to fix the light source module to an installation cavity.

The light source module may be a complete downlight product. Specifically, there are two or more fixing springs, like torsion springs or elastic clips that are used for holding the light source module to a typical installation cavity or a junction box.

In some embodiments, the wiring box has a spring enclosing the power wire to limiting a movement range of the power wire.

A spring is an elastic object that stores mechanical energy. Springs are typically made of spring steel. There are many spring designs. In everyday use, the term often refers to coil springs.

The coil spring has a central tunnel in its longitudinal direction. The power wire is inserted to such central tunnel so that the spring encloses the power wire to keep the power wire not moved arbitrarily.

In some embodiments, the spring has a first spring part and a second spring part. The first spring part and the second spring part has a bending angle for elastically limiting the movement of the power wire.

The power wire is limited in the central tunnel of the spring. Furthermore, the spring has at least two parts bent with a relative angle. Such arrangement keeps the power wire more stable, even on the way to move in or out of the spring.

In some embodiments, the wiring box has a first wire hole and a second wire hole. Two ends of the spring are respectively disposed to engage the first wire hole and the second wire hole.

The power wire passes through the second wire hole to electrically connect to the terminal connector of the base holder.

In some embodiments, the base holder has a reflector cup, and the light source module is enclosed in the reflector cup for the reflector cup to reflect an output light of the light source module.

The reflector cup may be a cone shape with a narrow top connected to the base holder and an enlarging trumpet shape for guiding light to move out of the base holder in desired directions.

In some embodiments, the reflector cup is detachable from the base holder to be replaced with another reflector cup with a different diameter and shape.

Users may change different reflector cups to fit different illuminance purposes.

In some embodiments, the wiring box has an entrance for fixing a top of the base holder.

In some embodiments, the wiring box and the base holder are installed to an installation platform in advance.

Users attach the light module to the base holder when needed.

In some embodiments, the base holder has an extended module to electrically connect to a driver circuit of the light source module to extend a function of the light source module.

The base holder may be installed with a circuit component that may be integrated with driver circuits in the light source module when the light source module is connected to the base holder.

For example, such circuit components may be a speaker, a wireless module, an antenna module, a processor or any function module.

Specifically, even the light source module itself does not have a function, such function may be provided by the circuit component (the extended module) stored in the base holder in advance.

In some embodiments, the extended module is a network circuit for connecting the light source module to a network.

In some embodiments, the base holder that is installed to a ceiling may have a network module that is connected to a network router of a house. In other words, the control signal may be passed to the light source module via the network module.

The network module may be associated to a position or a device identification. In an Internet of Things network, when the light source module is connected to the base holder, the light source module is identified by a server with a specific position, e.g. a light module in a living room or in a kitchen.

In such case, the server may control according to a pre-stored scheme to turn on, to turn off or change color temperature of the light source module by the location where the light source module is installed, not just to the light source module only.

In other words, such base holder also adds location information to the light source module, making a system control of multiple devices easier.

The term network circuit is not limited to communication network devices, but also to any signal wires for connecting multiple devices.

In some embodiments, a driver circuit of the light source module detects a connected type of the base holder to determine an operation mode for driving a LED module of the light source module.

In some embodiments, the base holder may have multiple types. Each types of base holder may correspond to certain parameters. Different types of base holders may have different connectors that mechanically or electrically inform the connected light source module to determine corresponding operation parameters, e.g. colors, intensity, light beam or diffusion light, color temperatures.

In some embodiments, the driver circuit detects a mode switch connected to the terminal connector to determine the connected type of the base holder.

The mode switch may be a structure switch that uses its structure protruding, concave, convex, curve or other shapes to trigger a signal received by the driver circuit of the light source module.

In some embodiments, the driver circuit determines a optical parameter set for driving the LED module to generate a corresponding output light.

In some embodiments, the light source module has a pull string structurally connected to the limit switch.

In some embodiments, the light source module may have a structure connecting to both the lever of the limit switch and a pull string. Users may pull the pull string to turn off the light source module.

DETAILED DESCRIPTION

Figure 17:
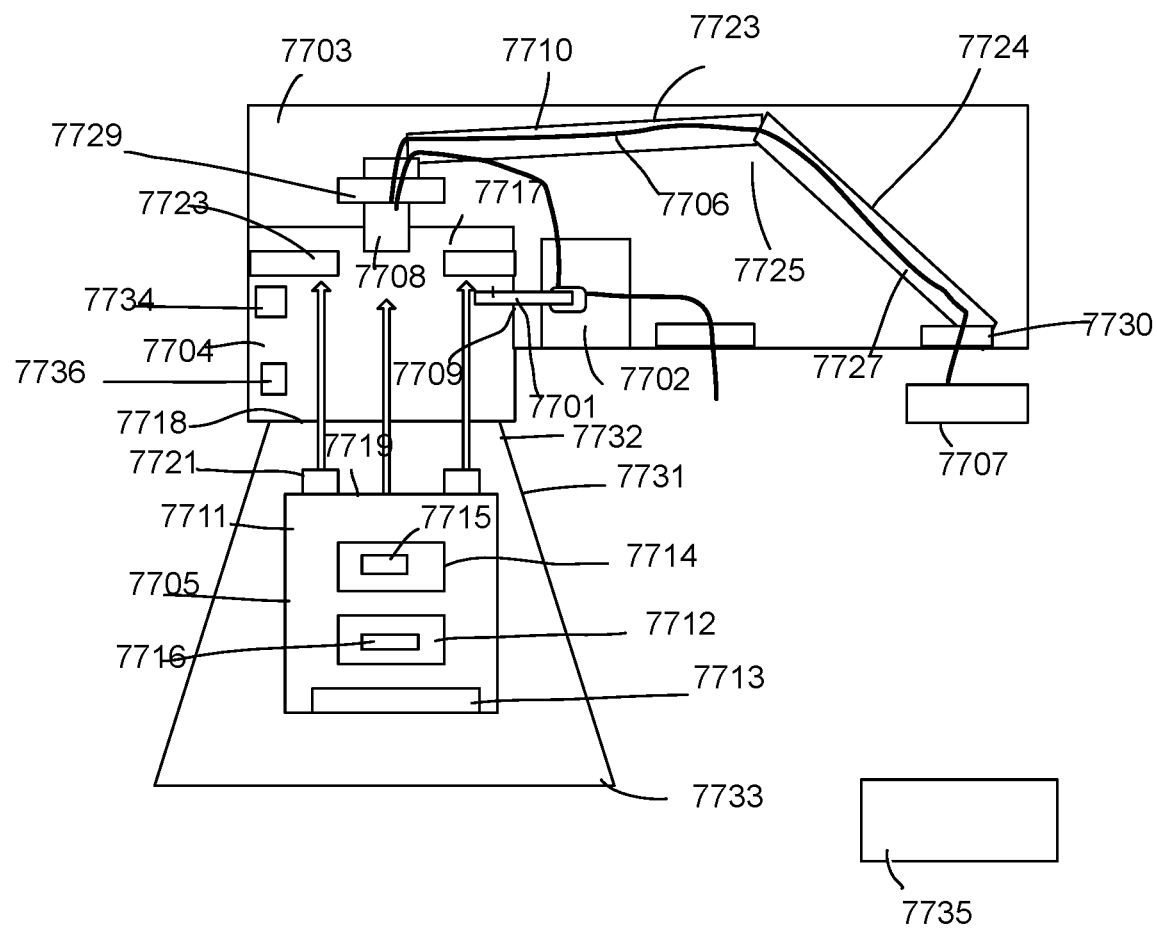
FIG. 17 shows an embodiment.

In FIG. 17, a lighting apparatus includes a limit switch 7702, a wiring box 7703, a base holder 7704, and a light source module 7705.

The wiring box 7703 is for disposing the limit switch 7702 and for receiving a power wire 7706 connected to an external power 7707.

The base holder 7704 has a terminal connector 7708 electrically connected to the wiring box 7703.

The base holder 7704 has an opening for inserting a lever of 7701 of the limit switch 7702.

The light source module 7705 is installed into the base holder 7704. The light source module 7705 triggers the lever 7701 of the limit switch 7702 to turn on power supply to the light source module 7705 via the power wire 7706 and the terminal connector 7708. A circuit diagram may be found in the example of FIG. 4 more clearly.

Specifically, a lighting apparatus has a wiring box 7703. The wiring box 7703 is fixed to the base holder 7704 and may be installed to an installation platform, like a cavity of a ceiling or a junction box.

The wiring box 7703 is used for guiding a power wire 7706 to enter a terminal connector 7708 of the base holder 7704. There are some springs 7710, e.g. an elastic pipe or elastic spring, for simplifying the assembly of the lighting apparatus.

The light source module may include a housing 7711, a light source plate 7712, lens (as an example, not directly shown), a light passing cover 7713, and/or a reflector cup (as an example, not directly shown). There are various types of light source modules that may be installed and attached to the base holder, e.g. a downlight device, a spot light, a light tube, a light bulb, a panel light.

In some embodiments, the light source module may also include a driver 7714 that may have corresponding driver circuits 7715 for generating a driving current by converting an external power source supplied from the power wire 7706. In addition, the driver circuits 7715 may receive a wireless command or a control signal to adjust output of the LED module 7716 on the light source plate 7712.

The light source module 7705 is connected to the terminal connector 7708. The terminal connector 7708 may provide an electrical connection to the power wire 7706. In addition, the terminal connector 7708 may have a structure connector for holding and fixing the light source module 7705.

The lever 7701 of the limit switch 7702 enters the inner part of the base holder 7704 so as to be able to engage the light source module 7705 (the arrow direction illustrated in FIG. 17). When the light source module 7705 is installed successfully into the base holder 7704, the housing 7711 of the light source module 7705 engages and presses the lever 7709 of the limit switch 7702 to enable the electrical path from the power wire 7706.

When the light source module is not installed to the correct position, the lever of the limit switch is not pressed or moved and thus the electrical path from the power path is kept open, i.e. no electricity entering the electrical path to keep the base holder safe, not to cause accident of electrical shock.

In some embodiments, the light source module is attached to the base holder by inserting the light source module to approach an inner top of the base holder.

When a relative distance between a first top of the light source module 7705 and the inner top 7717 of the base holder 7704 is less than a predetermined threshold, the first top of the light source module 7705 moves the lever 7701 of the limit switch 7702 to turn on the power supply.

The base holder 7704 has an entrance 7718 and may have a tubular, a cup or a cylinder shape. The light source module 7705 is inserted to connect to the base holder 7704 via the entrance 7718.

The light source module 7705 is inserted to approach, get closer to the inner top 7717 of the base holder 7704.

The lever 7701 of the limit switch 7702 is positioned at a moving path for the light source module 7705 to insert the base holder 7704. Finally, the first top 7719 of the light source module 7705 engages and presses the lever 7701 of the limit switch 7702 to turn on the power supply, making electricity to be successfully conducted to the light source module 7705 if other factors are met, e.g. the light source module 7705 is turned on.

In some embodiments, a ratio between the predetermined threshold to a height of the base holder is between 0.1 to 0.3.

Figure 18:
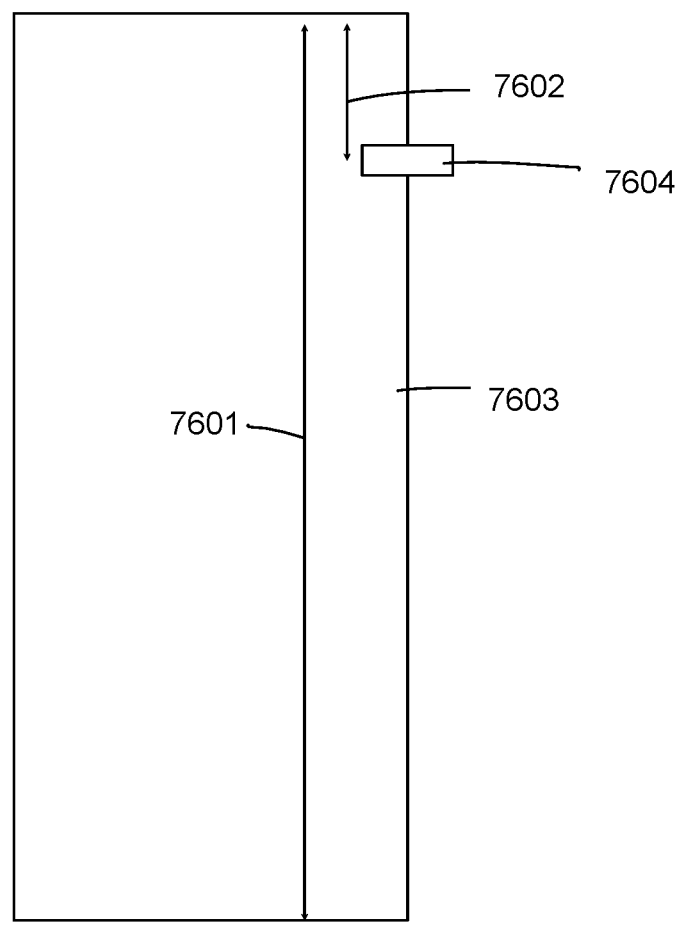
FIG. 18 shows a diameter ratio for components.

In FIG. 18, the length 7601 of the base holder 7603 is a depth for inserting the light source module mentioned above. The lever 7604 of the limit switch has a distance 7602 to a top bottom of the base holder 7603. The ratio of the distance 7602 to the length 7601 of the base holder is between 0.1 to 0.3

The base holder may have a depth length, i.e. the height of the base holder, along the path for the light source module to enter and connect to the base holder.

The predetermined threshold refers to the distance of the lever of the limit switch to the inner top of the base holder. To keep the lever performing its goal to keep people safe, the ratio between the predetermined threshold to a height of the base holder is between 0.1 to 0.3. In other words, the predetermined threshold is about 10% to 30% of the total height of the base holder.

In FIG. 17, the top of the light source module has multiple fixing columns 7721.

Figure 7:
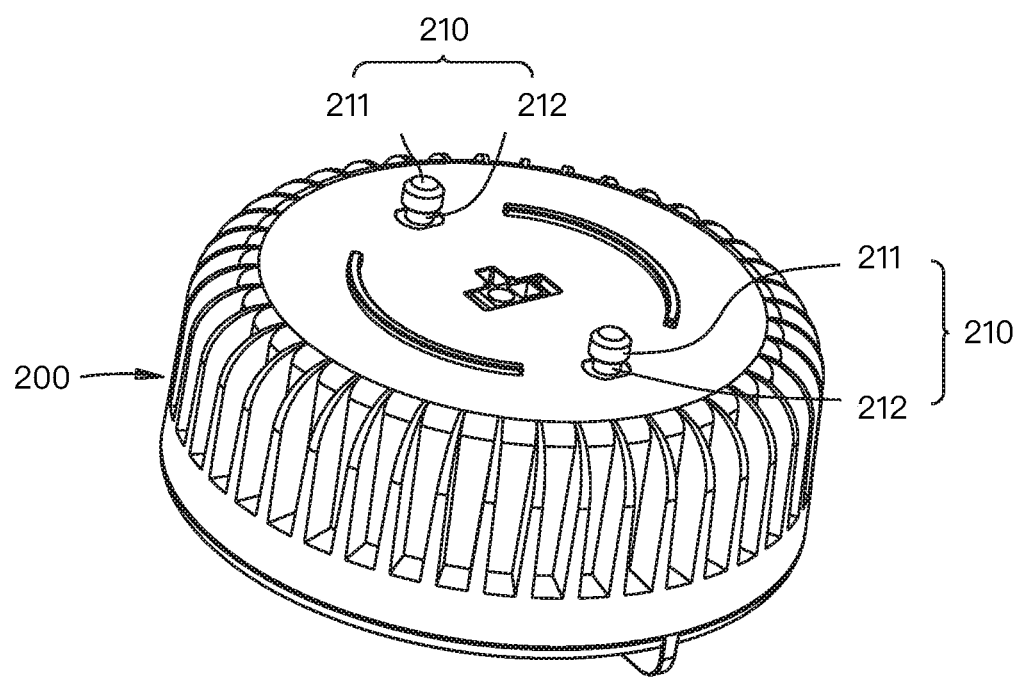
FIG. 7 illustrates a top view of a light source module example.

FIG. 7 shows a detailed diagram of an example in which each fixing column 210 of a light source module 200 has a protruding head 211 and a narrow neck 212.

A diameter of the protruding head 211 is larger than the narrow neck 212.

In FIG. 17, the base holder 7704 has multiple sliding grooves 7723 for inserting and fixing columns 7721.

When the fixing columns 7721 are inserted into the sliding grooves 7723 and rotate with respect to the sliding groove 7723, the light source module 7705 is fixed to the base holder 7704.

For example, the top of the light source module has a pair of fixing columns. Each fixing column has a head portion (the protruding head) larger than a neck portion (the narrow neck).

The fixing columns of the light source module are corresponding to the sliding grooves of the base holder respectively. The sliding groove has an entrance part with larger diameter for the protruding head to pass through. The sliding groove has a narrower sliding path so that the protruding head is kept inside the sliding groove while the narrow neck is moved along the sliding path of the sliding groove.

Figure 6:
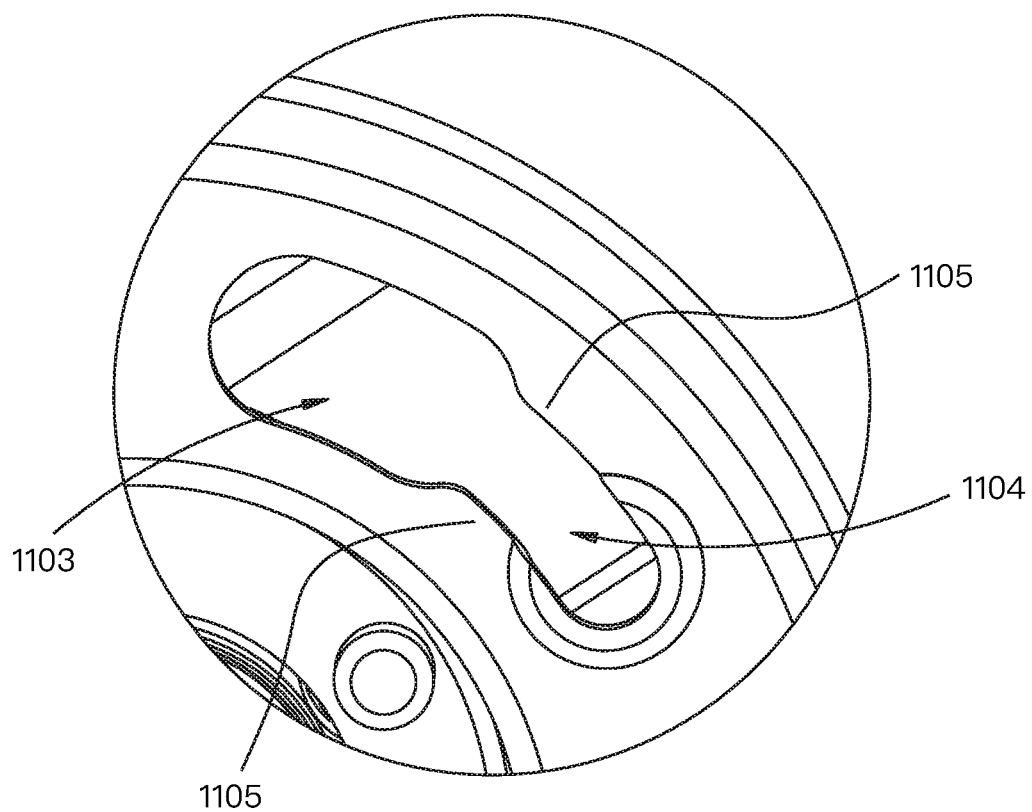
FIG. 6 illustrates a zoom-up view of a component in an example.

In the example of FIG. 6, the base holder has a sliding groove 1105 having an entrance part 1103 with a larger diameter for inserting the fixing column. A narrower sliding path 1104 is for sliding the fixing column.

Such design makes the light source module to be fixed to the base holder.

In some embodiments, a first diameter of an entrance part of the sliding groove is larger than the diameter of the protruding head.

A sliding part of the sliding groove has a second diameter larger than the narrow neck and small than the protruding head.

In some embodiments, the terminal connector is located at a center position symmetrically surrounding by the sliding grooves.

Figure 5:
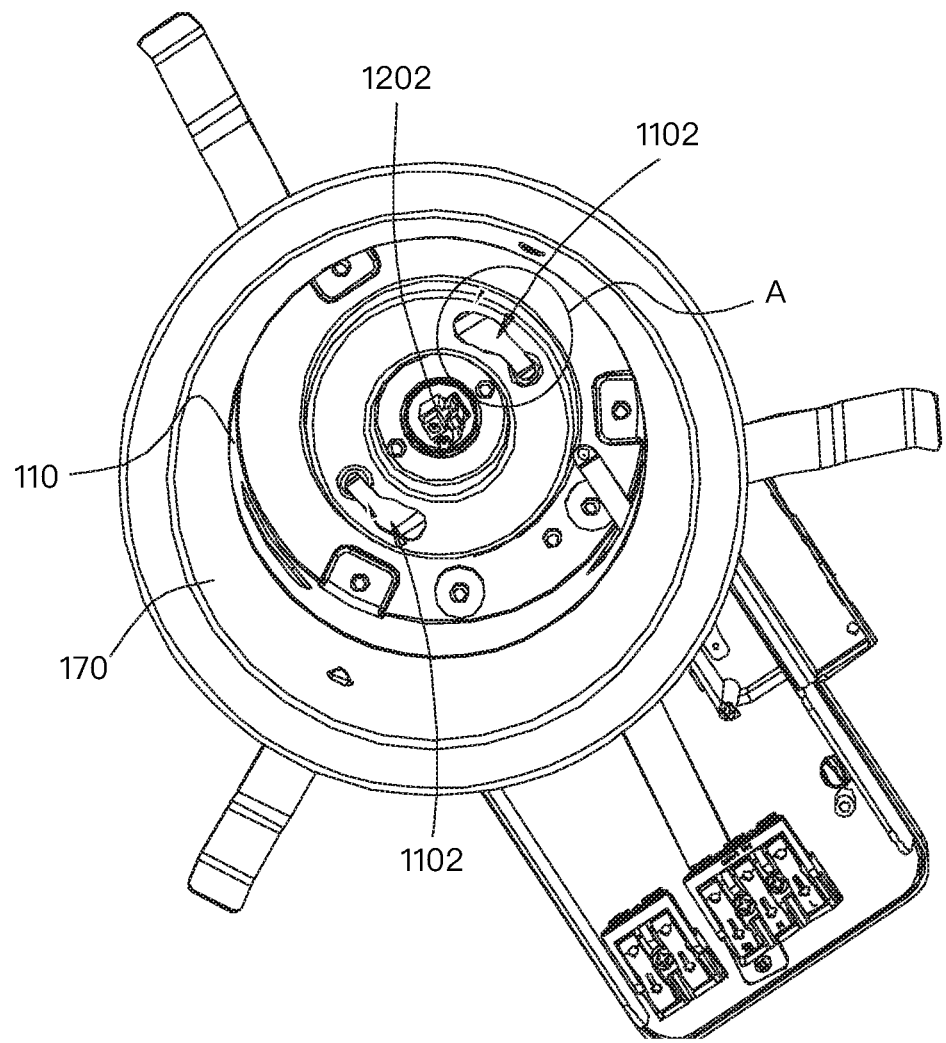
FIG. 5 illustrates another view of the example in FIG. 1

In FIG. 5, the sliding grooves 1102 are symmetrically surrounding the center terminal connector in a base holder 110 that has a reflector cup 170.

In some embodiments, the terminal connector is used for routing electricity from the power wire partly stored in the wiring box.

The terminal connector may have a plugging socket for connecting to a connecting wire at one end while the other end of the connecting wire is connected to the light source module.

In some other embodiments, the terminator may have an extended wire that may be directly plugged or fixed to the light source module in various ways, e.g. glue tapes.

In some embodiments, the light source module is a downlight device with multiple fixing springs to fix the light source module to an installation cavity.

The light source module may be a complete downlight product. Specifically, there are two or more fixing springs, like torsion springs or elastic clips that are used for holding the light source module to a typical installation cavity or a junction box.

Figure 1:
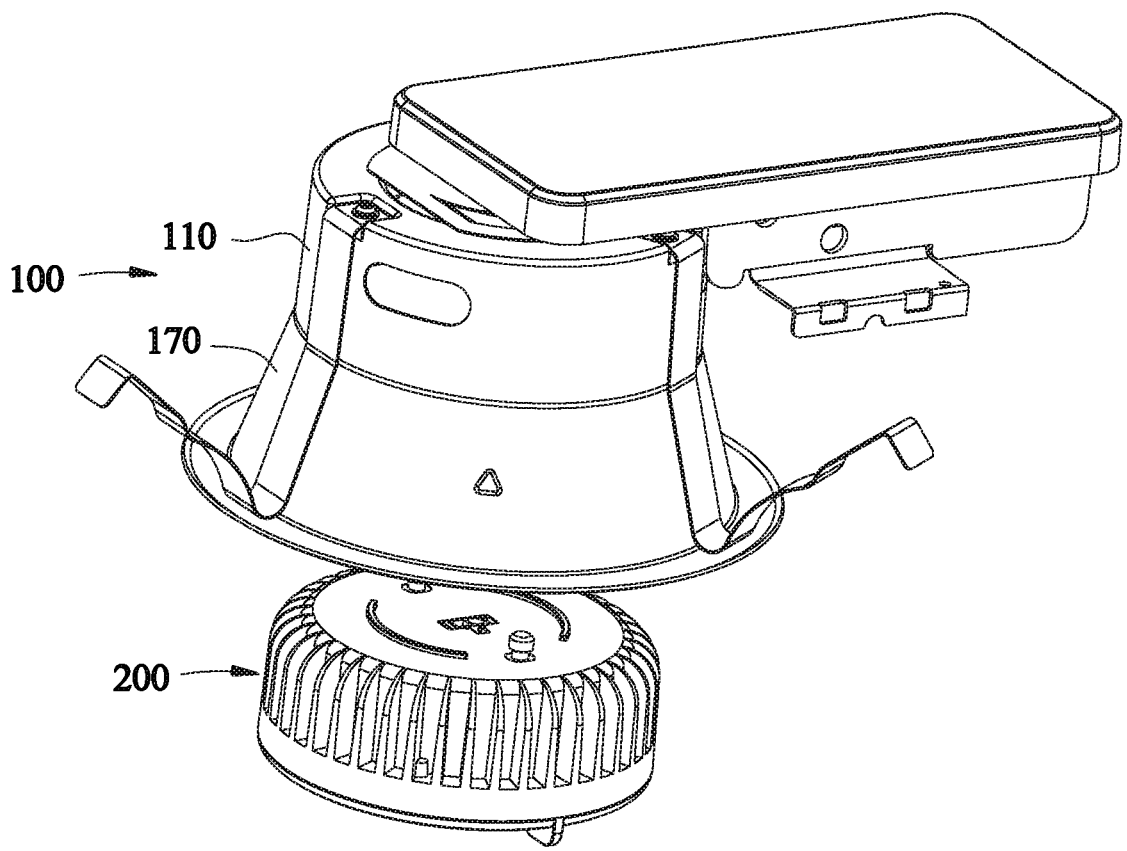
FIG. 1 illustrates a lighting apparatus with a detachable light source module.

For example, FIG. 1 shows that the base holder 110 has a reflector cup 170 with fixing springs. The base holder 110 together with the light source module 200 in this example form a typical downlight device 100 that may be installed to a cavity of a ceiling or a junction box.

In FIG. 17, the wiring box 7703 has a spring 7710 enclosing the power wire 7706 to limiting a movement range of the power wire 7706.

A spring is an elastic object that stores mechanical energy. Springs are typically made of spring steel. There are many spring designs. In everyday use, the term often refers to coil springs.

The coil spring has a central tunnel in its longitudinal direction. The power wire is inserted to such central tunnel so that the spring encloses the power wire to keep the power wire not moved arbitrarily.

In some embodiments, the spring has a first spring part 7723 and a second spring part 7724. The first spring part 7723 and the second spring part 7724 have a bending angle 7725 for elastically limiting the movement of the power wire 7706.

The power wire 7706 is limited in the central tunnel 7727 of the spring 7723. Furthermore, the spring has at least two parts bent with a relative angle. Such arrangement keeps the power wire more stable, even on the way to move in or out of the spring.

In some embodiments, the wiring box has a first wire hole 7730 and a second wire hole 7729. Two ends of the spring are respectively disposed to engage the first wire hole 7729 and the second wire hole 7729.

The power wire passes through the second wire hole 7729 to electrically connect to the terminal connector 7708 of the base holder 7704.

In some embodiments, the base holder has a reflector cup, and the light source module is enclosed in the reflector cup 7731 for the reflector cup 7731 to reflect an output light of the light source module 7705.

The reflector cup 7731 may be a cone shape with a narrow top 7732 connected to the base holder 7704 and an enlarging trumpet shape with a broader bottom 7733 for guiding light to move out of the base holder 7704 in desired directions.

In some embodiments, the reflector cup is detachable from the base holder to be replaced with another reflector cup with a different diameter and shape.

Users may change different reflector cups to fit different illuminance purposes.

In some embodiments, the wiring box has an entrance for fixing a top of the base holder.

In some embodiments, the wiring box and the base holder are installed to an installation platform in advance.

Users attach the light module to the base holder when needed. In some embodiments, the base holder 7704 has an extended module 7734 to electrically connect to a driver circuit 7715 of the light source module 7705 to extend a function of the light source module 7705.

The base holder may be installed with a circuit component, as an example of the extended module, that may be integrated with driver circuits 7715 in the light source module when the light source module is connected to the base holder.

For example, such circuit components may be a speaker, a wireless module, an antenna module, a processor or any function module.

Specifically, even the light source module itself does not have a function, such function may be provided by the circuit component (the extended module) stored in the base holder in advance.

In some embodiments, the extended module is a network circuit for connecting the light source module to a network.

In some embodiments, the base holder that is installed to a ceiling may have a network module that is connected to a network router of a house. In other words, the control signal may be passed to the light source module via the network module.

The network module may be associated to a position or a device identification. In an Internet of Things network, when the light source module is connected to the base holder, the light source module is identified by a server with a specific position, e.g. a light module in a living room or in a kitchen.

In such case, the server 7735 may control according to a pre-stored scheme to turn on, to turn off or change color temperature of the light source module by the location where the light source module is installed, not just to the light source module only.

In other words, such base holder also adds location information to the light source module, making a system control of multiple devices easier.

The term network circuit is not limited to communication network devices, but also to any signal wires for connecting multiple devices.

In some embodiments, a driver circuit of the light source module detects a connected type of the base holder to determine an operation mode for driving a LED module of the light source module.

In some embodiments, the base holder may have multiple types. Each types of base holder may correspond to certain parameters. Different types of base holders may have different connectors that mechanically or electrically inform the connected light source module to determine corresponding operation parameters, e.g. colors, intensity, light beam or diffusion light, color temperatures.

In some embodiments, the driver circuit detects a mode switch 7736 connected to the terminal connector to determine the connected type of the base holder.

The mode switch may be a structure switch that uses its structure protruding, concave, convex, curve or other shapes to trigger a signal received by the driver circuit of the light source module.

In some embodiments, the driver circuit determines a optical parameter set for driving the LED module to generate a corresponding output light.

In some embodiments, the light source module has a pull string structurally connected to the limit switch.

In some embodiments, the light source module may have a structure connecting to both the lever of the limit switch and a pull string. Users may pull the pull string to turn off the light source module.

Figure 2:
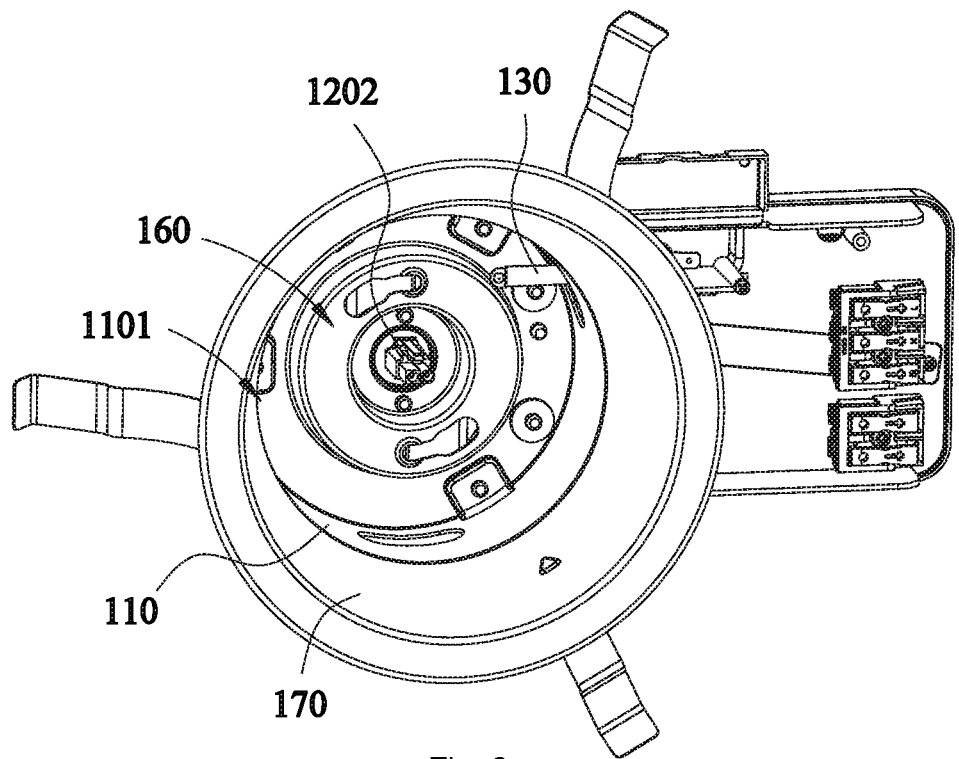
FIG. 2 illustrates another view of the example in FIG. 1

Please refer to FIG. 2. In FIG. 2, there is a lever 130 of a limit switch. A terminal connector 1202 is for connecting to a light source module. There are sliding grooves 160 corresponding fixing columns of a light source module, as mentioned above.

There are positioning grooves 1101 for aligning the connection of components for the base holder 110 to a light source module. There is a reflector cup 170.

Figure 3:
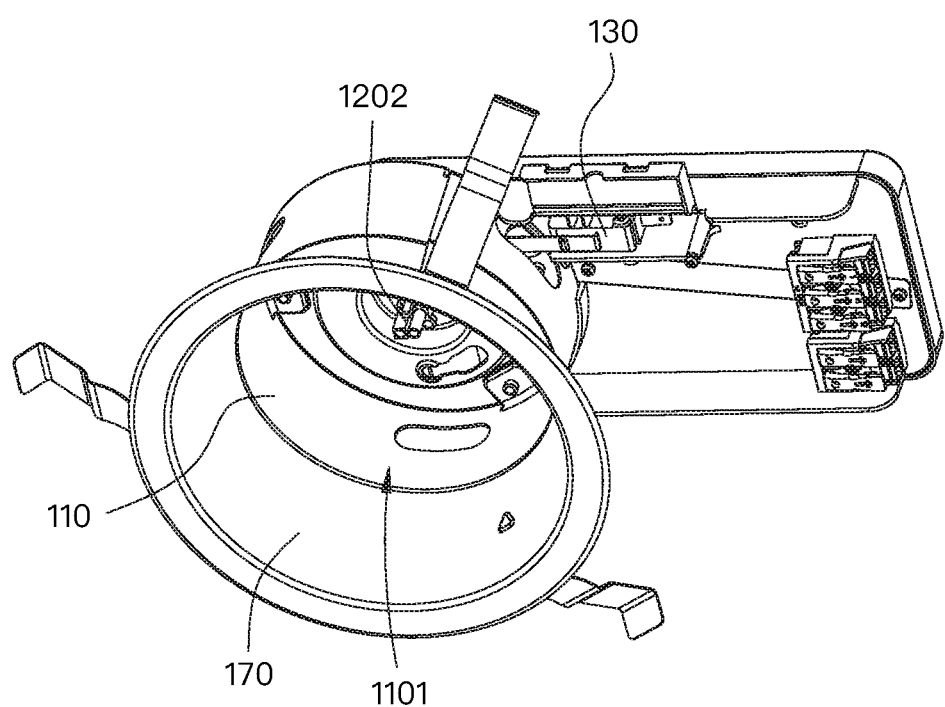
FIG. 3 illustrates another view of the example in FIG. 1.

Please refer to FIG. 3, which shows another view of the example in FIG. 2. Please be noted that the same reference numerals in this disclosure refer to the same components and description thereof are not repeated for brevity.

Figure 4:
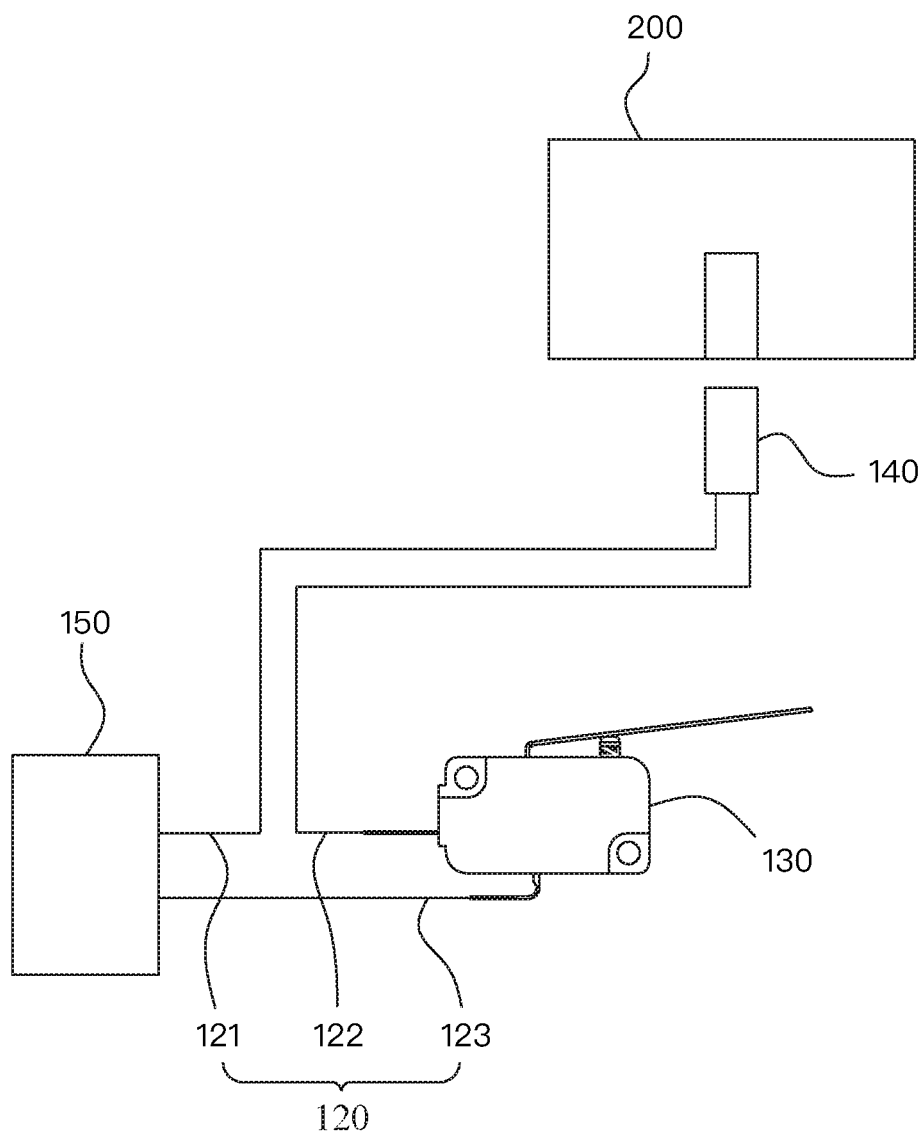
FIG. 4 illustrates a component connection diagram.

Please refer to FIG. 4. There is a terminal connector 140 connecting to a light source module 200. A limit switch 130 has a lever is used for turning on or turning off the conductive path of the power wires 120, which has several conductive wire parts 121, 122, 123 for connecting to an external power source 150.

FIG. 5 shows another view of the example mentioned above.

Figure 8:
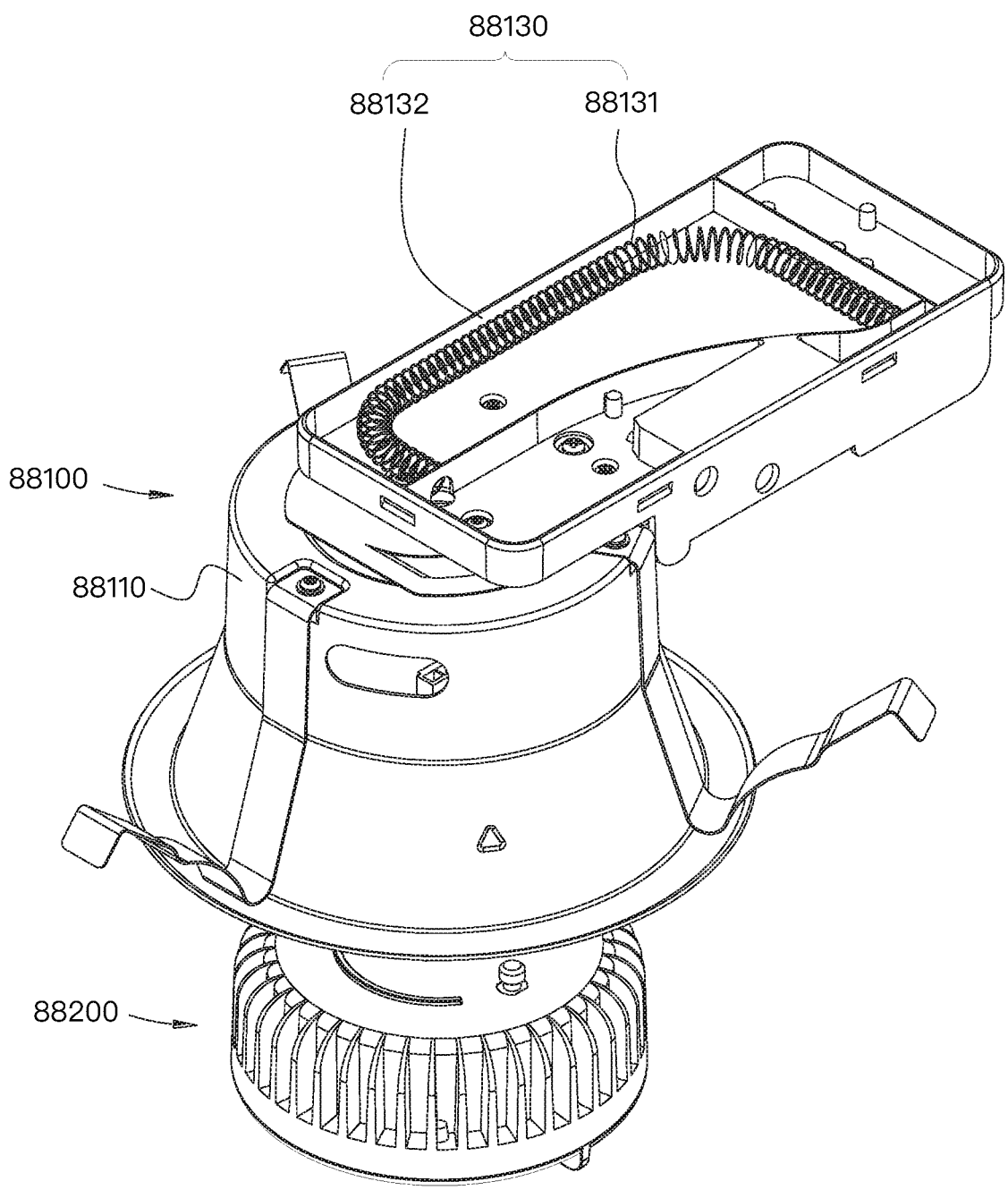
FIG. 8 illustrates another view of an embodiment.

FIG. 8 shows a wiring box 88130 having a first spring part 88132 and a second spring part 88131 bent with multiple angles for keeping the power wire therein more stable.

The base holder 88110 is connected to the light source module 88200 to form a light device 88100.

Figure 9:
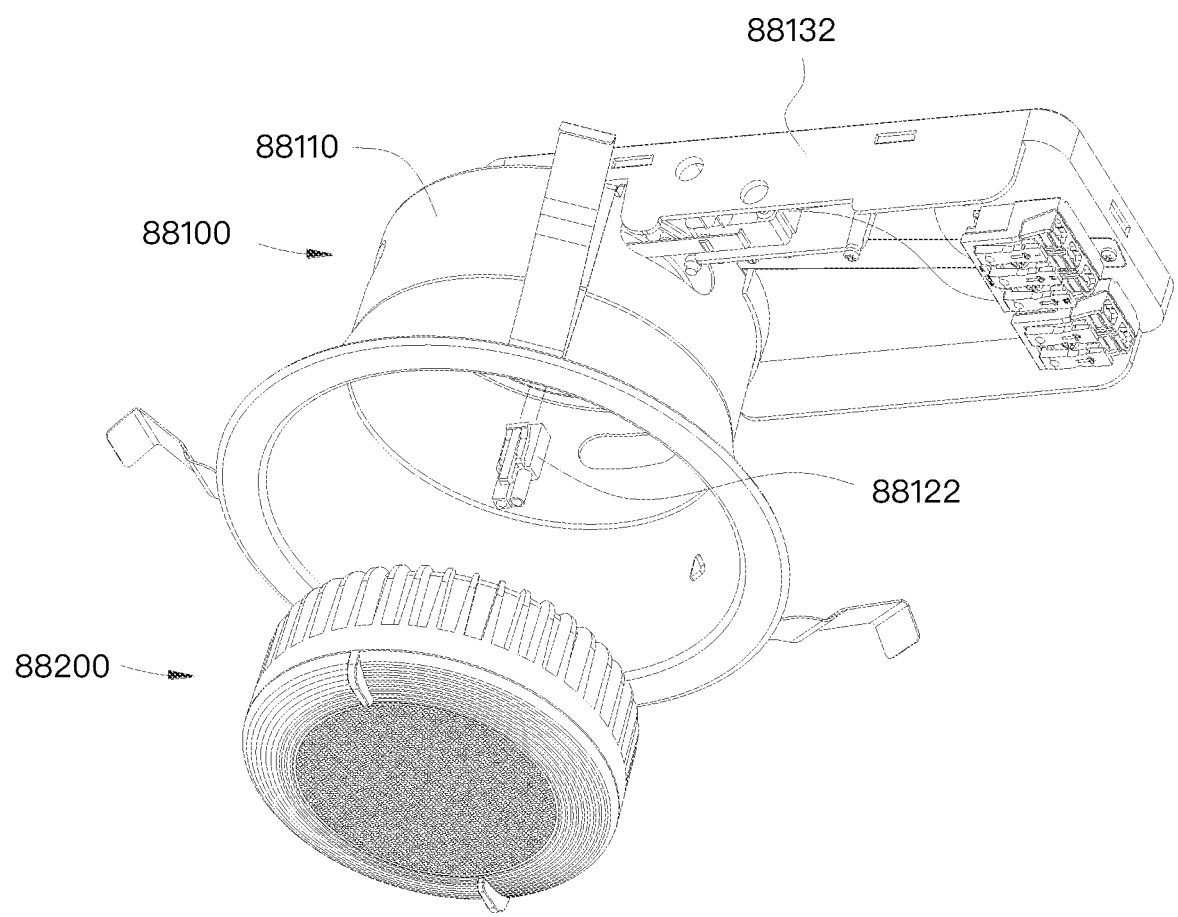
FIG. 9 illustrates another view of the example in FIG. 8.
Figure 10:
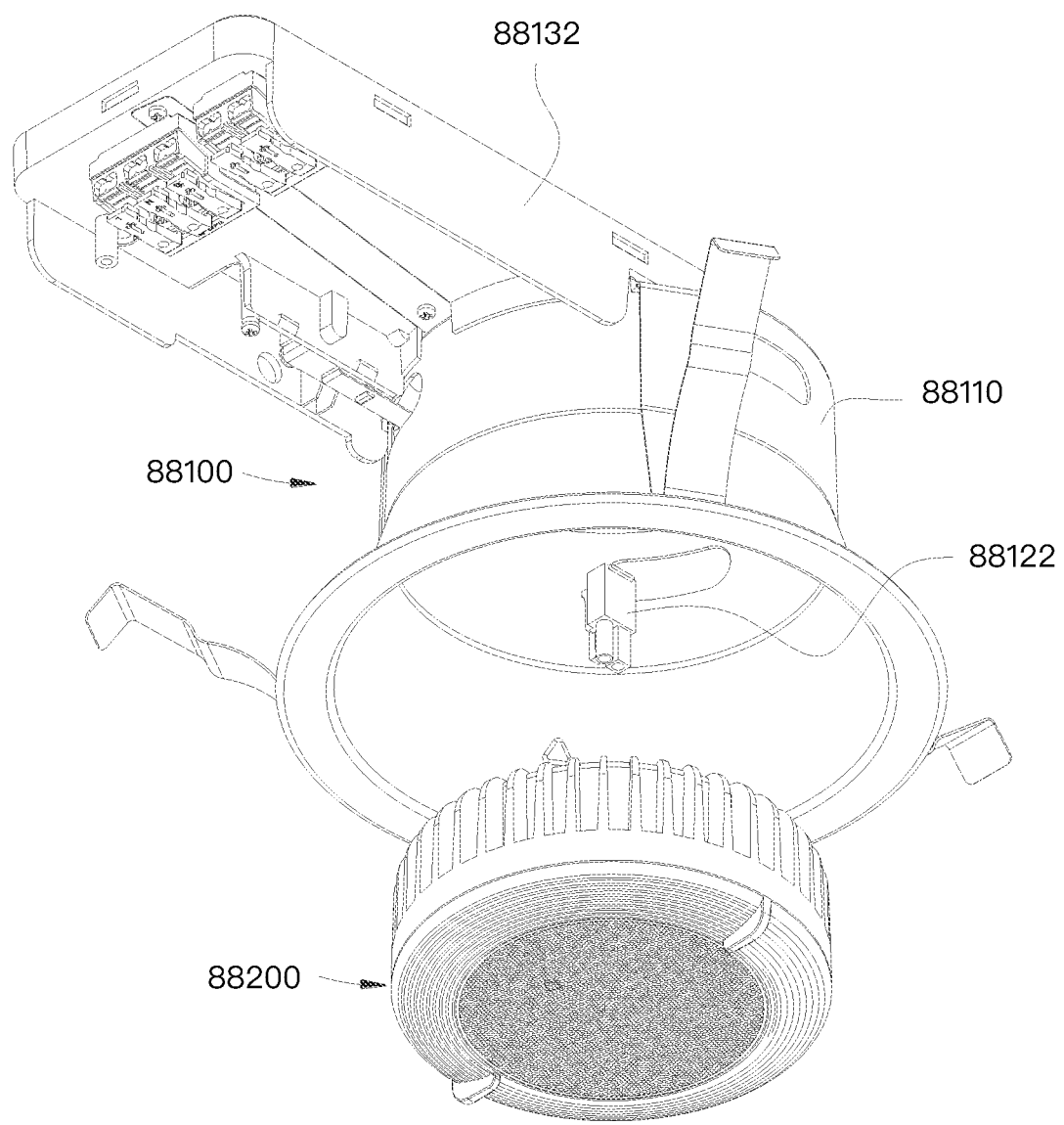
FIG. 10 illustrates an installation view of the embodiment.

FIG. 9 and FIG. 10 further show a plugging terminal connector 88122, e.g. an IDEAL connector, for connecting to the light source module 88200.

Figure 11:
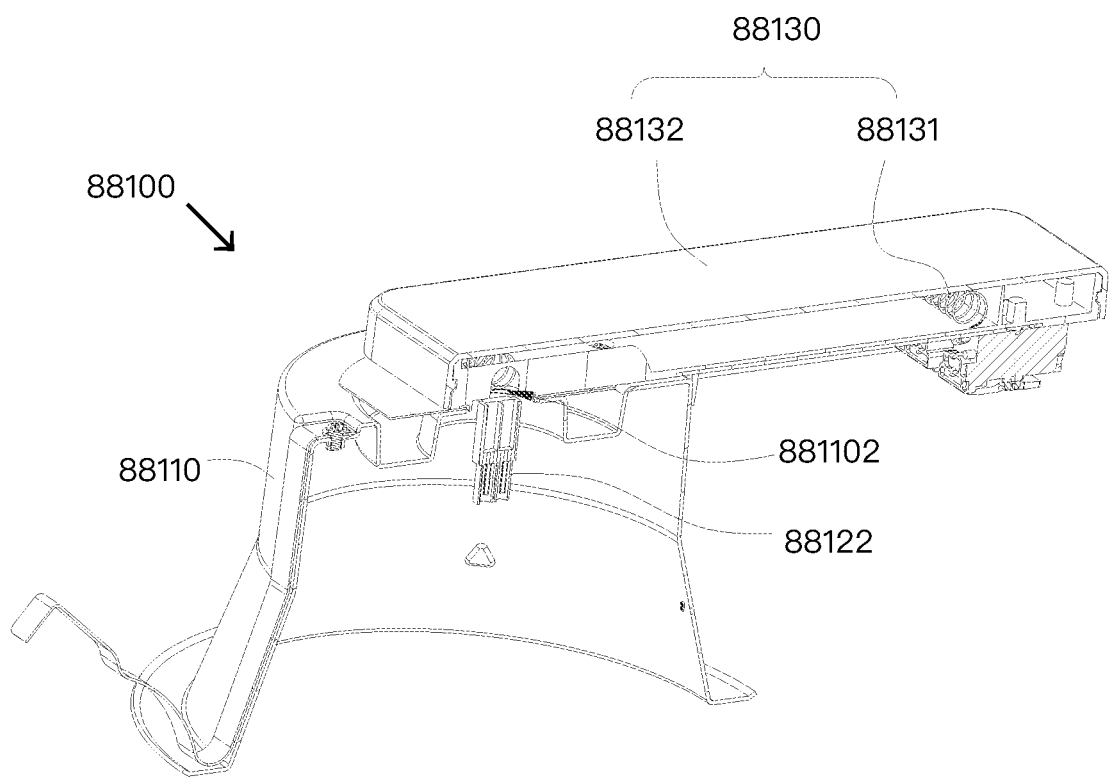
FIG. 11 illustrates a cross-sectional view of the example in FIG. 8.

FIG. 11 further show a wire passing opening 881102.

Figure 12:
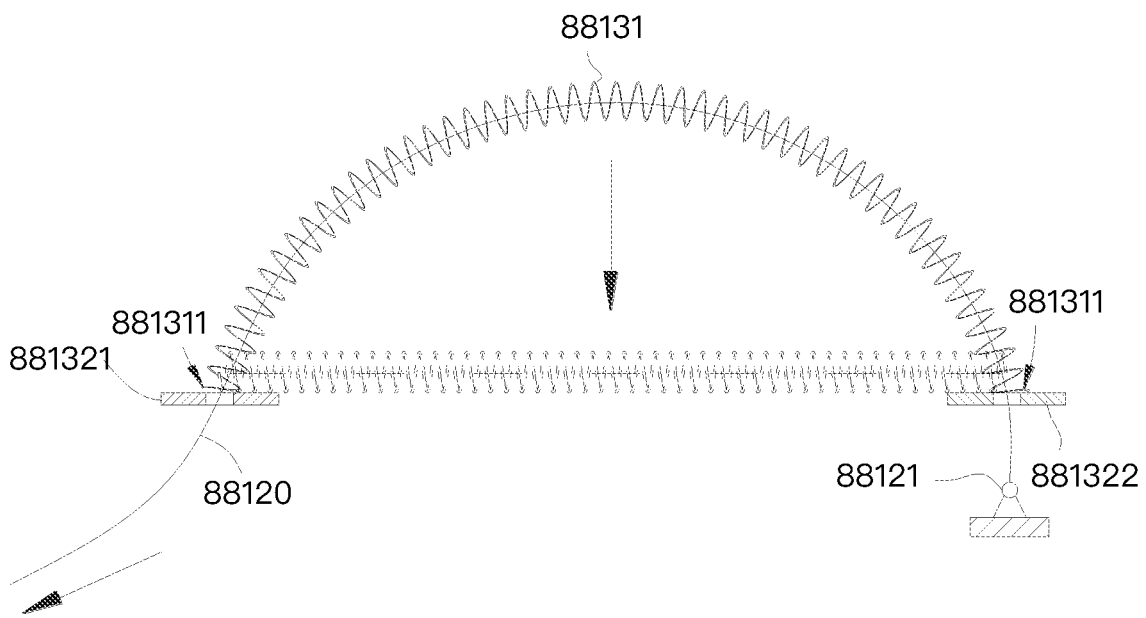
FIG. 12 illustrates a spring example in a wiring box.

FIG. 12 shows that the spring has limiter units 881321, 881322 for a spring part 881311 of a second spring part 88131 for limiting movement of a power wire 88120. There is a fixing end 88121 for fixing the power wire.

Figure 13:
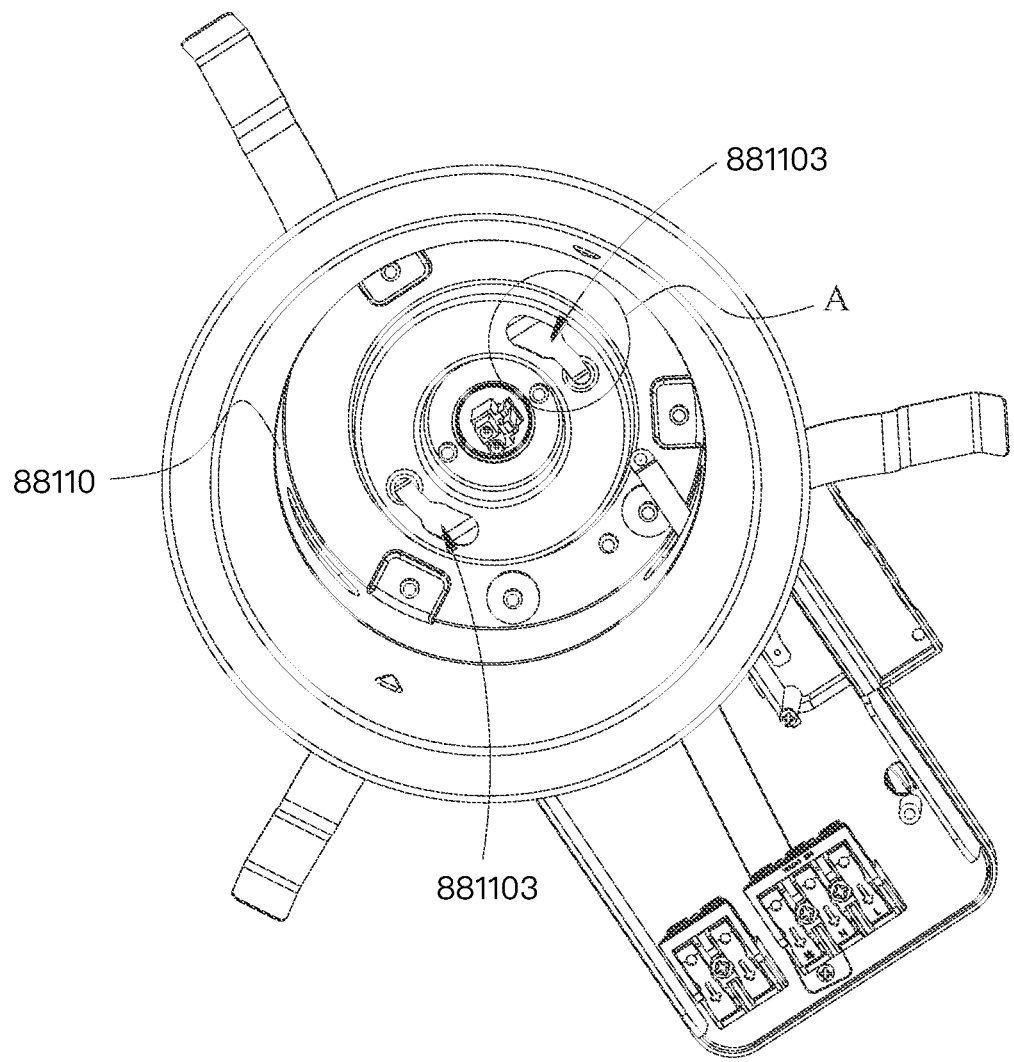
FIG. 13 illustrates a bottom view of an embodiment.

FIG. 13 shows sliding grooves 881103 for a base holder 88110.

Figure 14:
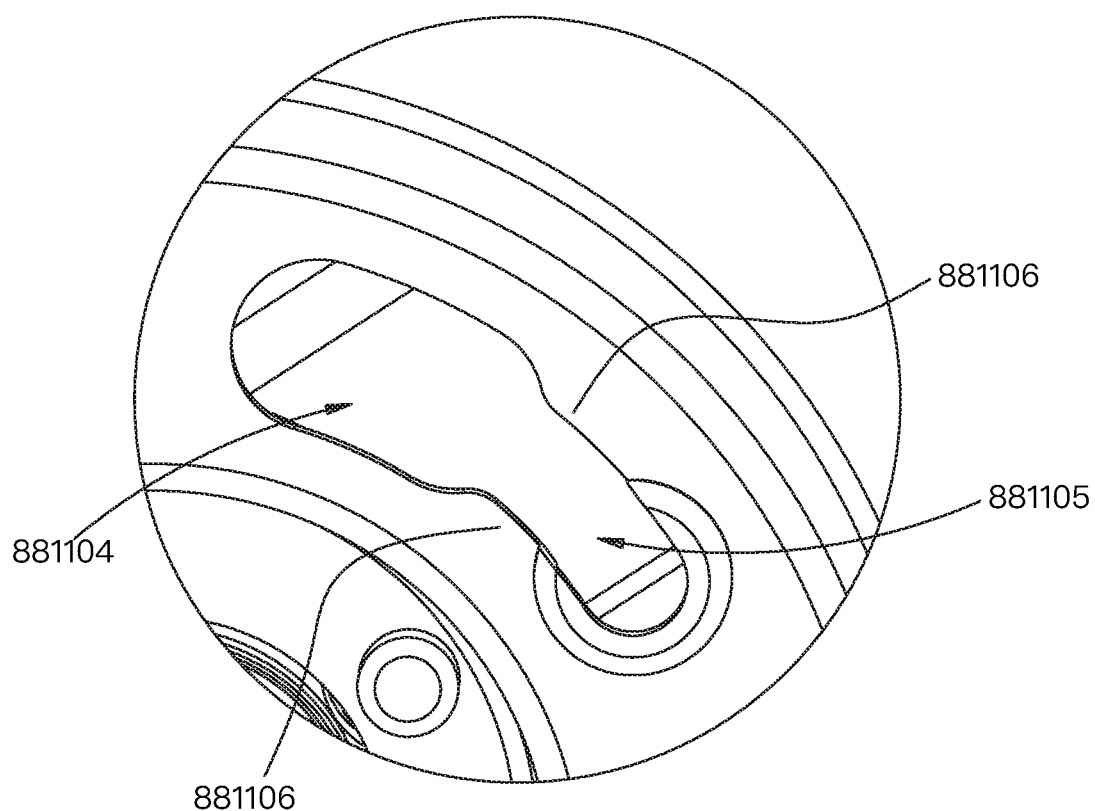
FIG. 14 illustrates a zoom-up view of an example for a component.

FIG. 14 shows a sliding groove 881106 having an entrance part 881104 and a sliding path 881105.

Figure 15:
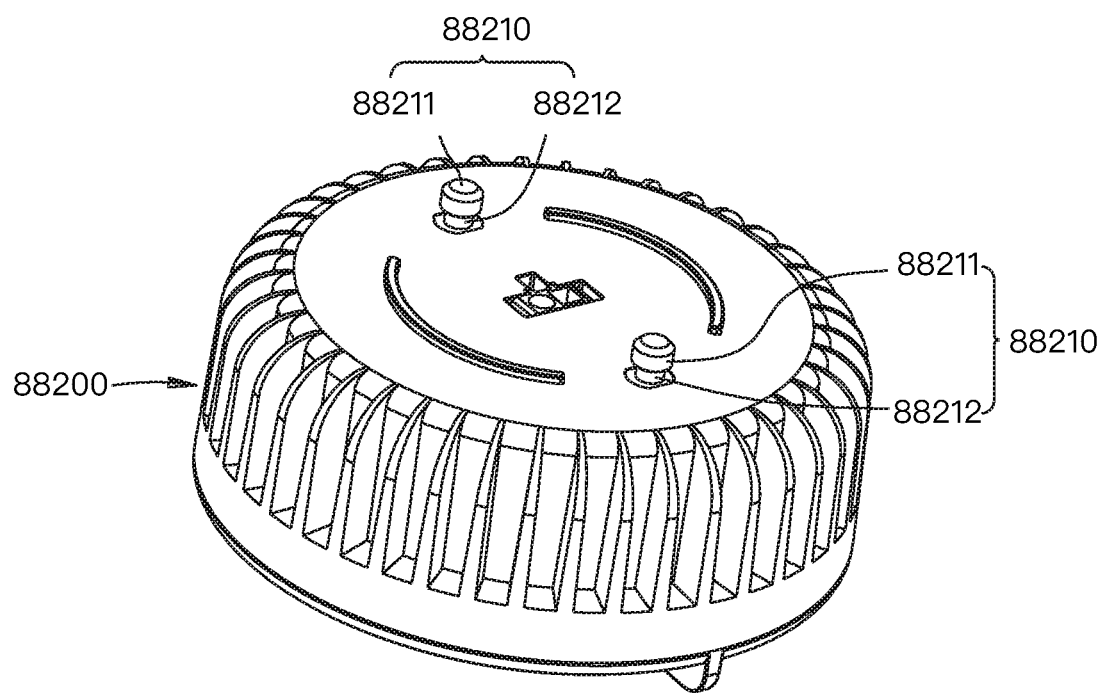
FIG. 15 illustrates a top view of a light source module.

FIG. 15 shows a light source module 88200 having fixing columns 88210 with a protruding head 88211 and a narrow neck 88212.

Figure 16:
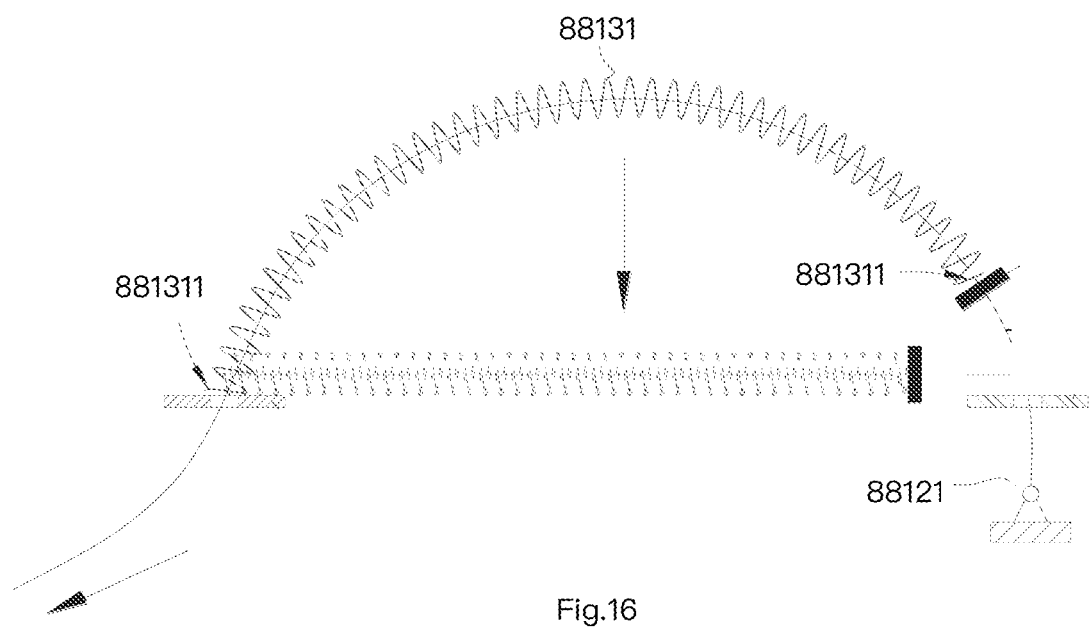
FIG. 16 illustrates another view of a wiring box.

FIG. 16, like FIG. 12, shows another view when the power wire is pulled with an external force.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings.

The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

The invention claimed is:

1. A lighting apparatus comprising:
a limit switch;
a wiring box for disposing the limit switch and for receiving a power wire connected to an external power;
a base holder having a terminal connector electrically connected to the wiring box, wherein the base holder has an opening for inserting a lever of the limit switch; and
a light source module installed into the base holder, wherein the light source module triggers the lever of the limit switch to turn on power supplied to the light source module via the power wire and the terminal connector.

2. The lighting apparatus of claim 1, wherein the light source module is attached to the base holder by inserting the light source module to approach an inner top of the base holder, when a relative distance between a first top of the light source module and the inner top of the base holder is less than a predetermined threshold, the first top of the light source module moves the lever of the limit switch to turn on the power supply.

3. The lighting apparatus of claim 2, wherein a ratio between the predetermined threshold to a height of the base holder is between 0.1 to 0.3.

4. The lighting apparatus of claim 2, wherein the top of the light source module has multiple fixing columns, each fixing column has a protruding head and a narrow neck, a diameter of the protruding head is larger than the narrow neck, the base holder has multiple sliding grooves for inserting and fixing columns, when the fixing column are inserted into the sliding grooves and rotate with respect to the sliding groove, the light source module is fixed to the base holder.

5. The lighting apparatus of claim 4, wherein a first diameter of an entrance part of the sliding groove is larger than the diameter of the protruding head, a sliding part of the sliding groove has a second diameter larger than the narrow neck and smaller than the protruding head.

6. The lighting apparatus of claim 4, wherein the terminal connector is located at a center position symmetrically surrounding by the sliding grooves.

7. The lighting apparatus of claim 1, wherein the light source module is a downlight device with multiple fixing springs to fix the light source module to an installation cavity.

8. The lighting apparatus of claim 1, wherein the wiring box has a spring enclosing the power wire to limit a movement range of the power wire.

9. The lighting apparatus of claim 8, wherein the spring has a first spring part and a second spring part, the first spring part and the second spring part have a bending angle for elastically limiting the movement of the power wire.

10. The lighting apparatus of claim 8, wherein the wiring box has a first wire hole and a second wire hole, two ends of the spring are respectively disposed to engage the first wire hole and the second wire hole, the power wire passes through the second wire hole to electrically connect to the terminal connector of the base holder.

11. The lighting apparatus of claim 1, wherein the base holder has a reflector cup, and the light source module is enclosed in the reflector cup for the reflector cup to reflect an output light of the light source module.

12. The lighting apparatus of claim 1, wherein the reflector cup is detachable from the base holder to be replaced with another reflector cup with a different diameter and shape.

13. The lighting apparatus of claim 1, wherein the wiring box has an entrance for fixing a top of the base holder.

14. The lighting apparatus of claim 1, wherein the wiring box and the base holder are installed to an installation platform, and the light source module is capable of being attached to and removed from the base holder by a user when needed.

15. The lighting apparatus of claim 1, wherein the base holder has an extended module to electrically connect to a driver circuit of the light source module to extend a function of the light source module.

16. The lighting apparatus of claim 15, wherein the extended module is a network circuit for connecting the light source module to a network.

17. The lighting apparatus of claim 1, wherein a driver circuit of the light source module detects a connected type of the base holder to determine an operation mode for driving a LED module of the light source module.

18. The lighting apparatus of claim 17, wherein the driver circuit detects a mode switch connected to the terminal connector to determine the connected type of the base holder.

19. The lighting apparatus of claim 17, wherein the driver circuit determines an optical parameter set for driving the LED module to generate a corresponding output light.

* * * * *